US012459469B2

(12) United States Patent
Yuan et al.

(10) Patent No.: US 12,459,469 B2
(45) Date of Patent: Nov. 4, 2025

(54) SKID AVOIDANCE DURING EMERGENCY BRAKING WITH CONTROL ALGORITHM OVERRIDE FOR AUTONOMOUS OR ASSISTED DRIVING VEHICLES

(71) Applicant: Apollo Autonomous Driving USA LLC, Sunnyvale, CA (US)

(72) Inventors: Baoping Yuan, Sunnyvale, CA (US); Yaoming Shen, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 198 days.

(21) Appl. No.: 18/349,100

(22) Filed: Jul. 7, 2023

(65) Prior Publication Data

US 2025/0010822 A1    Jan. 9, 2025

(51) Int. Cl.
*B60T 7/22*     (2006.01)
*B60T 8/176*    (2006.01)

(52) U.S. Cl.
CPC ............... *B60T 7/22* (2013.01); *B60T 8/176* (2013.01); *B60T 2201/00* (2013.01); *B60T 2220/04* (2013.01); *B60T 2250/04* (2013.01); *B60T 2270/10* (2013.01)

(58) Field of Classification Search
CPC .......... B60T 7/22; B60T 7/12; B60T 2201/00; B60T 2220/04; B60T 2250/04; B60T 2270/10; B60T 8/17; B60T 8/176; B60T 8/321
See application file for complete search history.

(56) References Cited

U.S. PATENT DOCUMENTS

| 9,744,953 | B2 * | 8/2017 | Udaka | B60T 8/17558 |
| 2015/0284005 | A1 * | 10/2015 | Suzuki | B60T 8/175 701/22 |
| 2020/0062335 | A1 * | 2/2020 | Wienss | B62J 45/41 |
| 2020/0114889 | A1 * | 4/2020 | Egnor | B60T 11/20 |
| 2022/0073043 | A1 * | 3/2022 | Amamoto | B60T 8/3255 |
| 2023/0033946 | A1 * | 2/2023 | Takeda | B60T 8/172 |

* cited by examiner

*Primary Examiner* — George C Jin
(74) *Attorney, Agent, or Firm* — WOMBLE BOND DICKINSON (US) LLP

(57) ABSTRACT

This disclosure provides systems and methods for deceleration control during emergency braking using control algorithm override. An embodiment of the present disclosure provides a computer-implemented method for deceleration by a controlling device of an autonomous driving vehicle (ADV). The method includes engaging a braking system of the ADV to decelerate the ADV using a first deceleration algorithm. When an onset of discrepancy between a velocity of the ADV and a corresponding wheel speed of the ADV is detected, a processing device, based on the discrepancy, overrides an output of the first deceleration algorithm using a second deceleration algorithm that prioritizes in reducing the discrepancy between the velocity of the ADV and the corresponding wheel speed of the ADV over a target rate of deceleration computed by the first deceleration algorithm.

20 Claims, 10 Drawing Sheets

SKID AVOIDANCE DURING EMERGENCY BRAKING WITH CONTROL ALGORITHM OVERRIDE FOR AUTONOMOUS OR ASSISTED DRIVING VEHICLES

FIELD

Embodiments of the present disclosure relate generally to operating autonomous driving vehicles. More particularly, embodiments of the disclosure relate to braking systems and the controls.

BACKGROUND

Vehicles operating in an autonomous mode (e.g., driverless) can relieve occupants, especially the driver, from some or all driving-related burdens. When operating in an autonomous mode, the vehicle can navigate to various locations using onboard sensors, processors, and controllers, with minimal human interaction or even without any human aboard.

AEB (autonomous emergency braking) may be engaged when a possible collision is detected or upon identifying a failure of an autonomous/assisted driving vehicle (ADV). An AEB system is capable of automatically decelerating the vehicle (often at a high rate of deceleration as allowable by the tires and/or the road conditions) for preventing car crashes, and/or reducing the impact if unavoidable. When determining the rate of deceleration, however, AEB systems often fail to consider road conditions, such as slipperiness due to water, leaves, or ice. Although anti-lock braking systems (ABSs) may prevent total lockup of the wheels and tires, the ADV is unable to properly determine braking controls due to the lack of proper feedback when the ABS is activated. As a result, the ADV's braking system often cannot properly provide control instructions to achieve desired deceleration (e.g., avoiding collisions and staying in control).

SUMMARY

The present disclosure provides methods, systems, and techniques for providing deceleration control, such as during an automatic emergency braking (AEB), to avoid skidding (also referred to as "slipping" herein) in an autonomous or assisted driving vehicle (ADV). In particular, when skidding is imminent or detected, instead of or in addition to activating anti-locking mechanisms, this disclosure provides a second braking control algorithm to temporarily override the original braking control algorithm to generate proper braking pressure, as the original braking control algorithm may output unrealistic and impractical values due to traction limitations.

At a high level, the present disclosure provides a method that enables braking, during an emergency, with skid avoidance using control algorithm override. For example, most braking control algorithms determine an output of braking pressure based on a difference between a desired terminal velocity and a measured velocity (e.g., the greater the difference, the higher the pressure for inducing a greater deceleration). The difference may be used to compute feedforward, proportional, integral, and derivative terms for calculating the output of the braking pressure. In conventional controls, one or more of these terms may be improperly determined due to skidding (e.g., as the actual velocity does not reduce, the difference might further increase the braking pressure, which does not help recovering from the skidding). In aspects, the present disclosure provides methods of overriding the original braking algorithm with a second braking algorithm, for determining a braking pressure corresponding to a value before skidding or a lower value for avoiding skidding. As such, regardless whether the cause for skidding persists, the braking system generates a braking pressure that results in the highest deceleration available.

According to a first aspect, an embodiment of the disclosure provides a computer-implemented method for deceleration by a controlling device of an autonomous driving vehicle (ADV). The method includes engaging a braking system of the ADV to decelerate the ADV using a first deceleration algorithm. When an onset of discrepancy between a velocity of the ADV and a corresponding wheel speed of the ADV is detected, a processing device, based on the discrepancy, overrides an output of the first deceleration algorithm using a second deceleration algorithm that prioritizes in reducing the discrepancy between the velocity of the ADV and the corresponding wheel speed of the ADV over a target rate of deceleration computed by the first deceleration algorithm.

According to a second aspect, an embodiment of the disclosure provides a data processing system of an ADV. The data processing system includes a processor; and a memory coupled to the processor to store instructions, which when executed by the processor, cause the processor to perform operations. The operations include engaging a braking system of the ADV to decelerate the ADV using a first deceleration algorithm. When an onset of discrepancy between a velocity of the ADV and a corresponding wheel speed of the ADV is detected, the operations include overriding, by a processing device based on the discrepancy, an output of the first deceleration algorithm using a second deceleration algorithm that prioritizes in reducing the discrepancy between the velocity of the ADV and the corresponding wheel speed of the ADV over a target rate of deceleration computed by the first deceleration algorithm.

According to a third aspect, an embodiment of the disclosure provides a non-transitory machine-readable medium having instructions stored therein, which when executed by a processor, cause the processor to perform operations. The operations include: engaging a braking system of the ADV to decelerate the ADV using a first deceleration algorithm; detecting an onset of discrepancy between a velocity of the ADV and a corresponding wheel speed of the ADV; and overriding, by a processing device based on the discrepancy, an output of the first deceleration algorithm using a second deceleration algorithm prioritizing in reducing the discrepancy between the velocity of the ADV and the corresponding wheel speed of the ADV over a target rate of deceleration computed by the first deceleration algorithm.

BRIEF DESCRIPTION OF THE DRAWINGS

Embodiments of the disclosure are illustrated by way of example and not limitation in the figures of the accompanying drawings in which like references indicate similar elements.

Like reference numerals indicate like elements.

DETAILED DESCRIPTION

Figure 1:
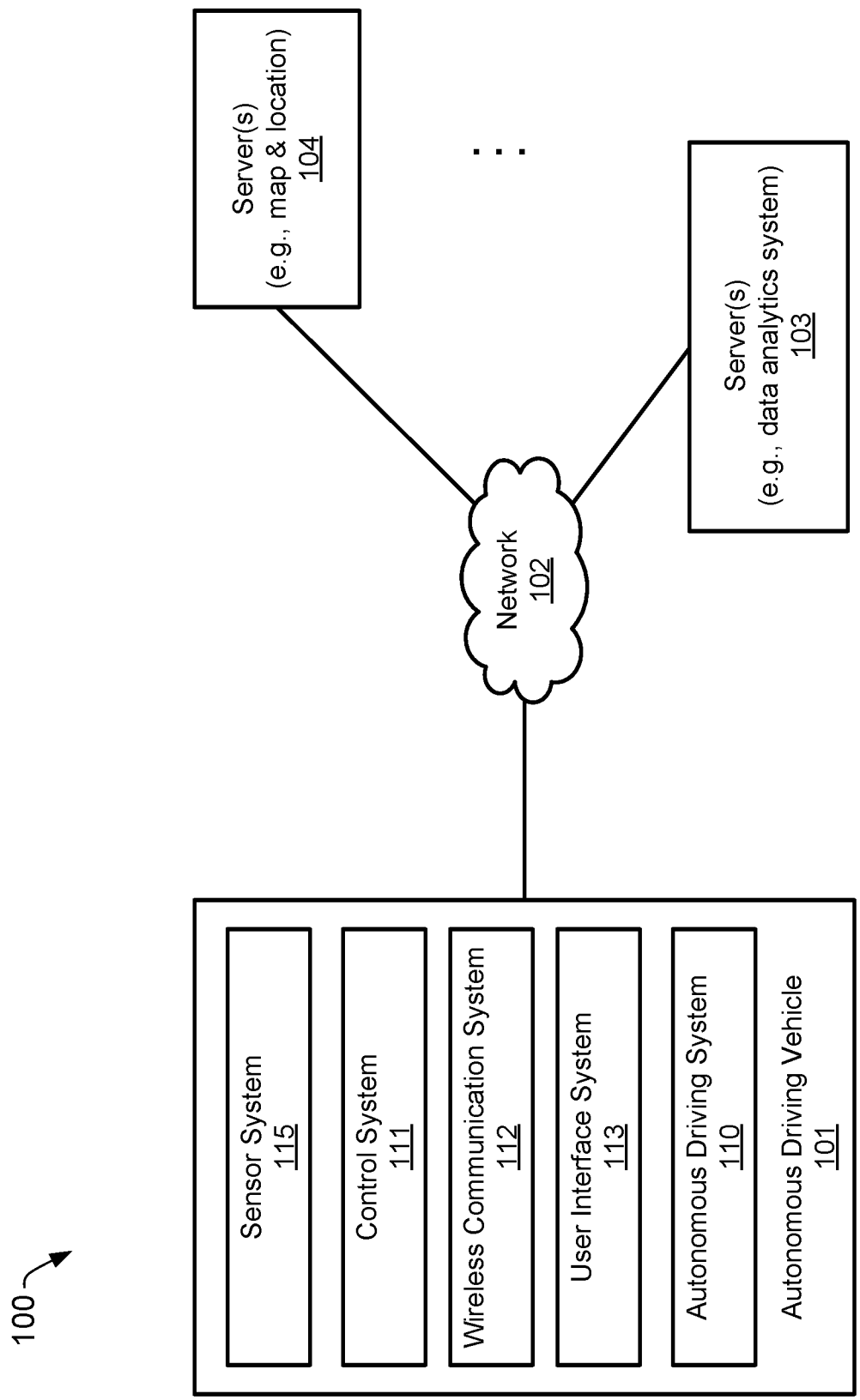
FIG. 1 is a block diagram illustrating a networked system, in accordance with aspects of the present disclosure.

Various embodiments and aspects of the disclosures will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, the present disclosure provides systems and methods for deceleration control that avoids skidding or minimizes control errors during skidding (e.g., during emergency braking) using control algorithm override. Conventionally, emergency braking controls increase the braking pressures when the current velocity of the vehicle exceeds a desired velocity of the vehicle, even if the vehicle skids. As such, even if the vehicle could regain traction due to an improvement of the road conditions, the high braking pressure may nonetheless cause the vehicle to lose traction or engage anti-lock braking systems (ABSs) as the braking controls cannot factor in the road conditions in the calculation of the braking pressure. The present disclosure overcomes such issues in conventional braking controls, by overriding the original braking algorithm (e.g., for normal road conditions) with a second braking algorithm that recalculates the braking pressure to avoid skid, so as to reduce the discrepancy between the velocity of the vehicle and the corresponding wheel speed of the vehicle. This way, the vehicle may reach the desired safe velocity sooner than using the original braking algorithm.

According to aspects of the present disclosure, a first (e.g., default) braking control algorithm uses a control strategy such as proportional-integral-derivative (PID) controller or the like (e.g., proportional-derivative control, proportional-integral control, lead-lag compensation control, state feedback control, model predictive control, etc.). In some cases, the control strategy includes a feedforward (FF) component, such as combining feedforward control with the PID control. In some cases, other control strategies may be used as the first braking control algorithm, such as adaptive control, fuzzy logic control, neural network control, and/or robust control.

Various control algorithms may subject to different impact by the erroneous or lack of feedback during skidding, and may similarly benefit from the overriding aspects of this disclosure. For example, during automatic emergency braking, the first braking control algorithm may rely on the deceleration (e.g., the rate of change of velocities, such as the derivative term) as a feedback component to determine a proper braking pressure. When skidding occurs, the difference between a desired deceleration and the actual deceleration may increase and result in an increased braking pressure that is not applicable to the skidding situation (regardless of whether ABS is being actuated). That is, even if the road condition returns to pre-skidding conditions that may properly provide traction, the first control algorithm may not immediately determine a proper braking pressure value due to the control algorithm terms affected by the skidding. The present disclosure provides methods for overriding the braking pressure output using a second deceleration algorithm that prioritizes in reducing the discrepancy between the velocity of the ADV and the corresponding wheel speed of the ADV over a target rate of deceleration computed by the first deceleration algorithm, so as to output a proper braking pressure when the skidding is over. This way, the second braking control algorithm protects the ADV against unreasonable or impractical values of control output by the first braking control algorithm.

FIG. 1 is a block diagram illustrating an autonomous driving network configuration, in accordance with aspects of the present disclosure of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
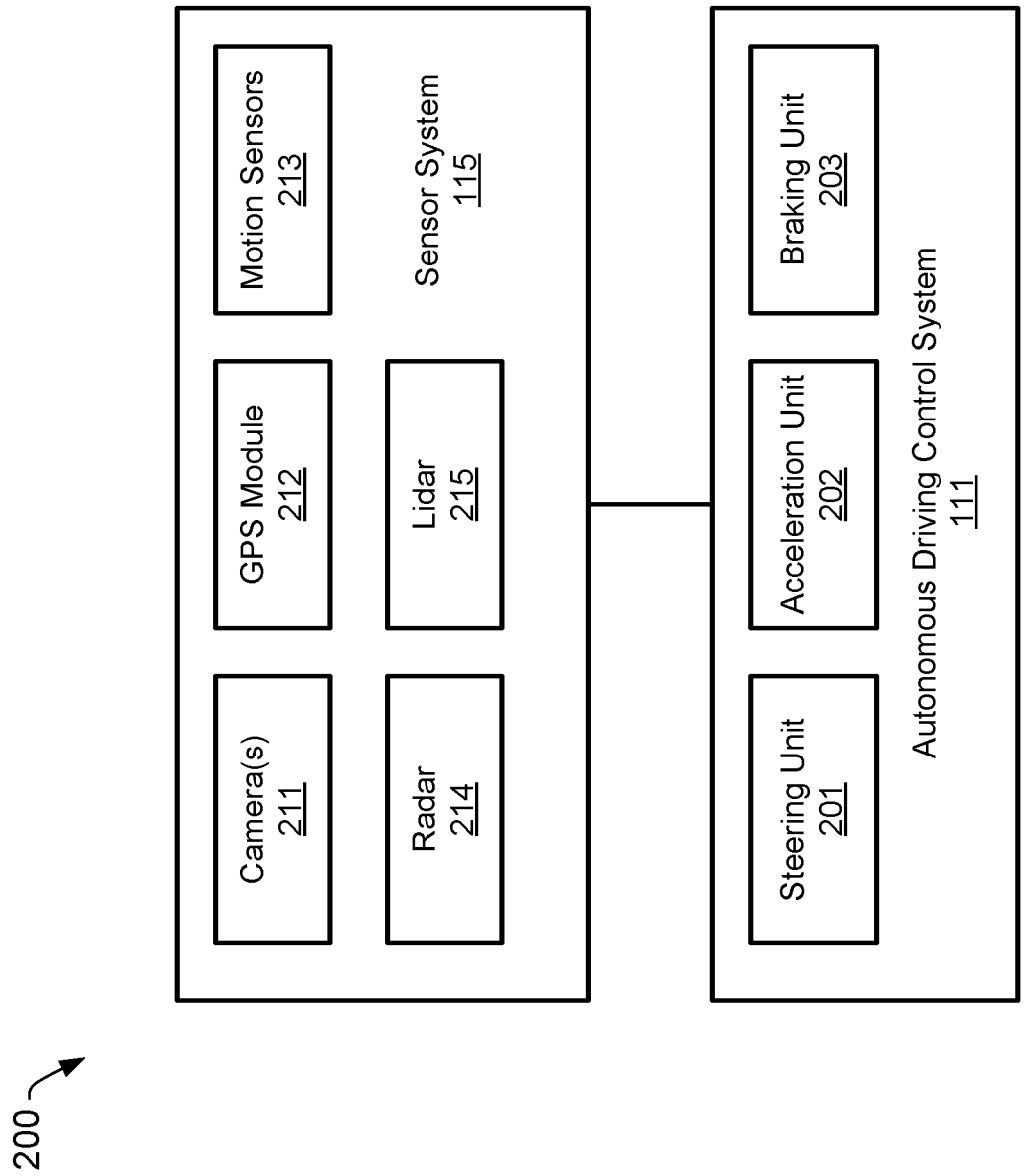
FIG. 2 is a block diagram illustrating an example of an autonomous/assisted driving (AD) vehicle, in accordance with aspects of the present disclosure.

Referring now to FIG. 2, which is a block diagram 200 illustrating an example of an autonomous/assisted driving (AD) vehicle (ADV), in accordance with aspects of the present disclosure. As shown, the sensor system 115 includes, but it is not limited to, one or more cameras 211, global positioning system (GPS) unit or module 212, motion sensors 213 (e.g., an inertial measurement unit (IMU), an accelerometer, etc.), radar unit 214, and a light detection and range (LIDAR) unit 215. The GPS module 212 may include a transceiver operable to provide information regarding the position of the ADV. The motion sensors 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, a steering unit 201, an acceleration unit 202, and a braking unit 203 (also referred to as the braking system 203). The steering unit 201 is to adjust the direction or heading of the vehicle. The acceleration unit 202 is to control the speed of the motor or engine that in turn controls the speed and acceleration of the vehicle. The steering unit 201 and the acceleration unit 202 may be coupled, in part, with the deceleration control of FIG. 6. The braking unit 203 is to decelerate the vehicle by providing friction to slow the wheels or tires of the vehicle. The braking unit 203 may be coupled, in part, with the brake control module 308 of FIG. 3. As further discussed in FIG. 6, the braking unit 203 may include a deceleration control that receives various information from other components of the ADV (e.g., vehicle and occupant status). Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3:
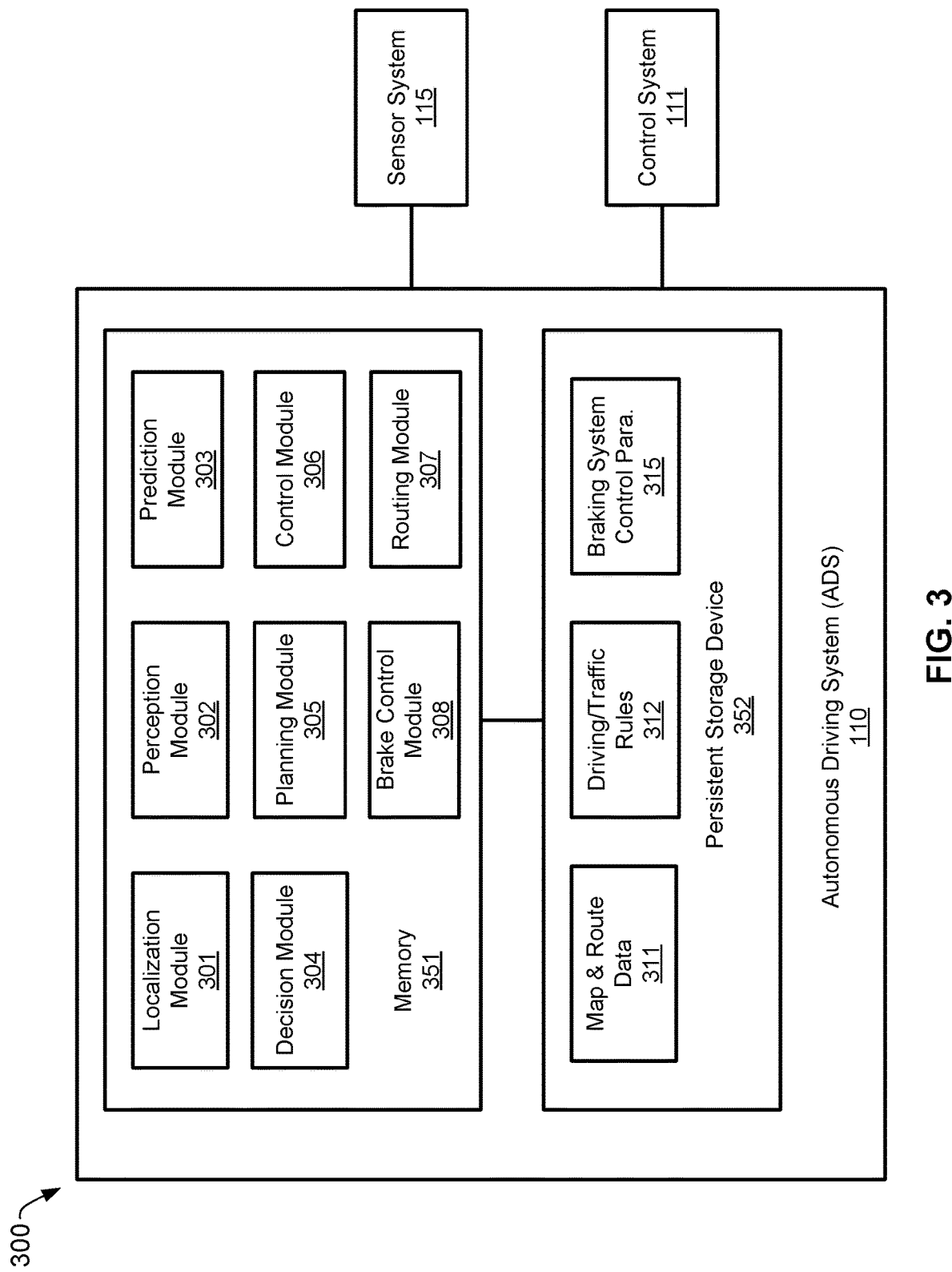
FIG. 3 is a block diagram illustrating an example of an AD system for an autonomous driving vehicle, in accordance with aspects of the present disclosure.

FIG. 3 is a block diagram illustrating an example of an AD system for an autonomous driving vehicle. The system 300 may be implemented as a part of ADV 101 of FIG. 1 including, but not limited to, ADS 110, control system 111, and sensor system 115. Referring to FIG. 3, the ADS 110 includes, but is not limited to, a localization module 301, a perception module 302, a prediction module 303, a decision module 304, a planning module 305, a control module 306, a routing module 307, and a brake control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

The localization module 301 determines a current location of the ADV 300 (e.g., leveraging GPS module 212) and manages any data related to a trip or route of a user. The localization module 301 (also referred to as a map and route module) manages any data related to a trip or route of a user. A user may log in and specify a starting location and a destination of a trip, for example, via a user interface. The localization module 301 communicates with other components of the ADV 300, such as map and route data 311, to obtain the trip related data. For example, the localization module 301 may obtain location and route data from a location server and a map and POI (MPOI) server. A location server provides location services and an MPOI server provides map services and the POIs of certain locations, which may be cached as part of map and route data 311. While the ADV 300 is moving along the route, the localization module 301 may also obtain real-time traffic information from a traffic information system or server.

Based on the sensor data provided by sensor system 115 and localization information obtained by the localization module 301, a perception of the surrounding environment is determined by the perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

The perception module 302 may include a computer vision system or functionalities of a computer vision system to process and analyze images captured by one or more cameras in order to identify objects and/or features in the environment of the ADV 300. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. The perception module 302 can also detect objects based on other sensors data provided by other sensors such as a radar and/or LIDAR.

For each of the objects, the prediction module 303 predicts what the object will behave under the circumstances. The prediction is performed based on the perception data perceiving the driving environment at the point in time in view of a set of map/route information 311, traffic rules 312, and braking system control parameters 315. For example, if the object is a vehicle at an opposing direction and the current driving environment includes an intersection, the prediction module 303 will predict whether the vehicle will likely move straight forward or make a turn. If the perception data indicates that the intersection has no traffic light, the prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. The prediction module 303 may calculate a rate of deceleration or stop distance based on the braking system control parameters 315 to determine a safe zone for driving at a desired speed. For example, some obstacles/vehicles or road conditions may cause the prediction module 303 to steer or decelerate to maintain the safe zone (e.g., clearance from other vehicles or obstacles). The braking control parameters 315 may include recorded deceleration data indicating an upper limit and/or environment correlated deceleration rates. In some cases, the braking system control parameters 315 may be modified by the deceleration control of FIG. 6.

For each of the objects, decision module 304 makes a decision regarding how to handle the object. For example, for a particular object (e.g., another vehicle in a crossing route) as well as its metadata describing the object (e.g., a speed, direction, turning angle), the decision module 304 decides how to encounter the object (e.g., overtake, yield, stop, pass). The decision module 304 may make such decisions according to a set of rules such as traffic rules or driving rules 312, which may be stored in the persistent storage device 352.

The routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. The routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to the decision module 304 and/or planning module 305. The decision module 304 and/or planning module 305 may examine all of the possible routes to select and modify one of the most optimal routes in view of other data provided by other modules such as traffic conditions from the localization module 301, driving environment perceived by the perception module 302, and traffic condition predicted by the prediction module 303. The actual path or route for controlling the ADV may be close to or different from the reference line provided by the routing module 307 dependent upon the specific driving environment at the point in time.

Based on a decision for each of the objects perceived, the planning module 305 plans a path or route for the ADV, as well as driving parameters (e.g., distance, speed, and/or turning angle), using a reference line provided by the routing module 307 as a basis. That is, for a given object, the decision module 304 decides what to do with the object, while the planning module 305 determines how to do it. For example, for a given object, decision module 304 may decide to pass the object, while the planning module 305 may determine whether to pass on the left side or right side of the object. Planning and control data is generated by planning module 305 including information describing how the vehicle 101 would move in a next moving cycle (e.g., next route/path segment). For example, the planning and control data may instruct the vehicle 101 to move 10 meters at a speed of 30 miles per hour (mph), then to change to a right lane at the speed of 25 mph.

Based on the planning and control data, the control module 306 controls and drives the ADV, by sending proper commands or signals to the vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, the planning module 305 plans a next route segment or path segment, for example, including a target position and the time required for the ADV to reach the target position. Alternatively, the planning module 305 may further specify the specific speed, direction, and/or steering angle, etc. In one embodiment, the planning module 305 plans a route segment or path segment for the next predetermined period of time such as 5 seconds. For each planning cycle, the planning module 305 plans a target position for the current cycle (e.g., next 5 seconds) based on a target position planned in a previous cycle. The control module 306 then generates one or more control commands (e.g., throttle, brake, steering control commands) based on the planning and control data of the current cycle.

Note that the decision module 304 and the planning module 305 may be integrated as an integrated module. The decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via the user interface system 113. The navigation system may update the driving path dynamically while the ADV is in operation. The navigation system can incorporate data from a GPS system and one or more maps so as to determine the driving path for the ADV.

Figure 4:
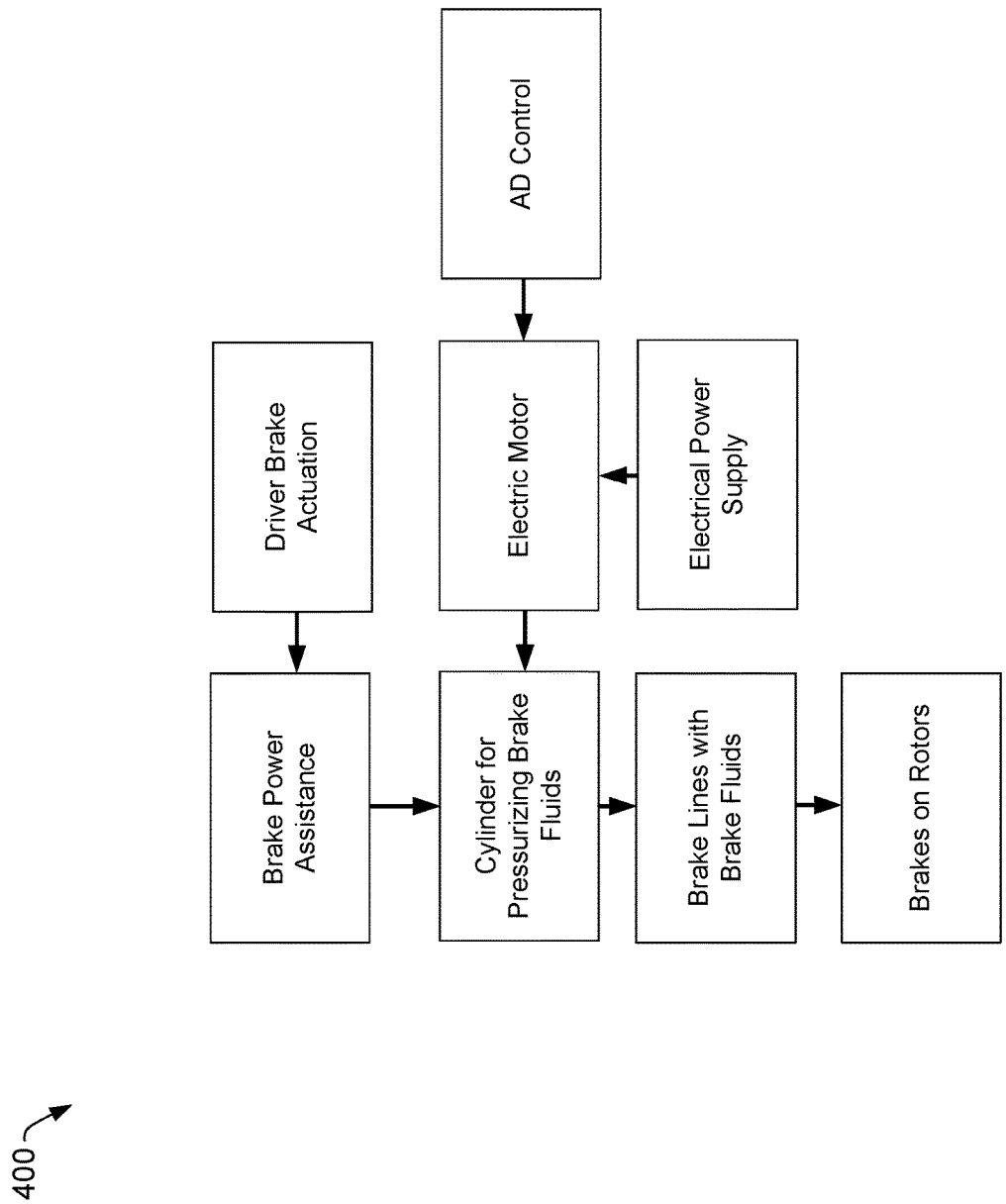
FIG. 4 is a block diagram illustrating an example of a braking system, in accordance with aspects of the present disclosure.
Figure 5:
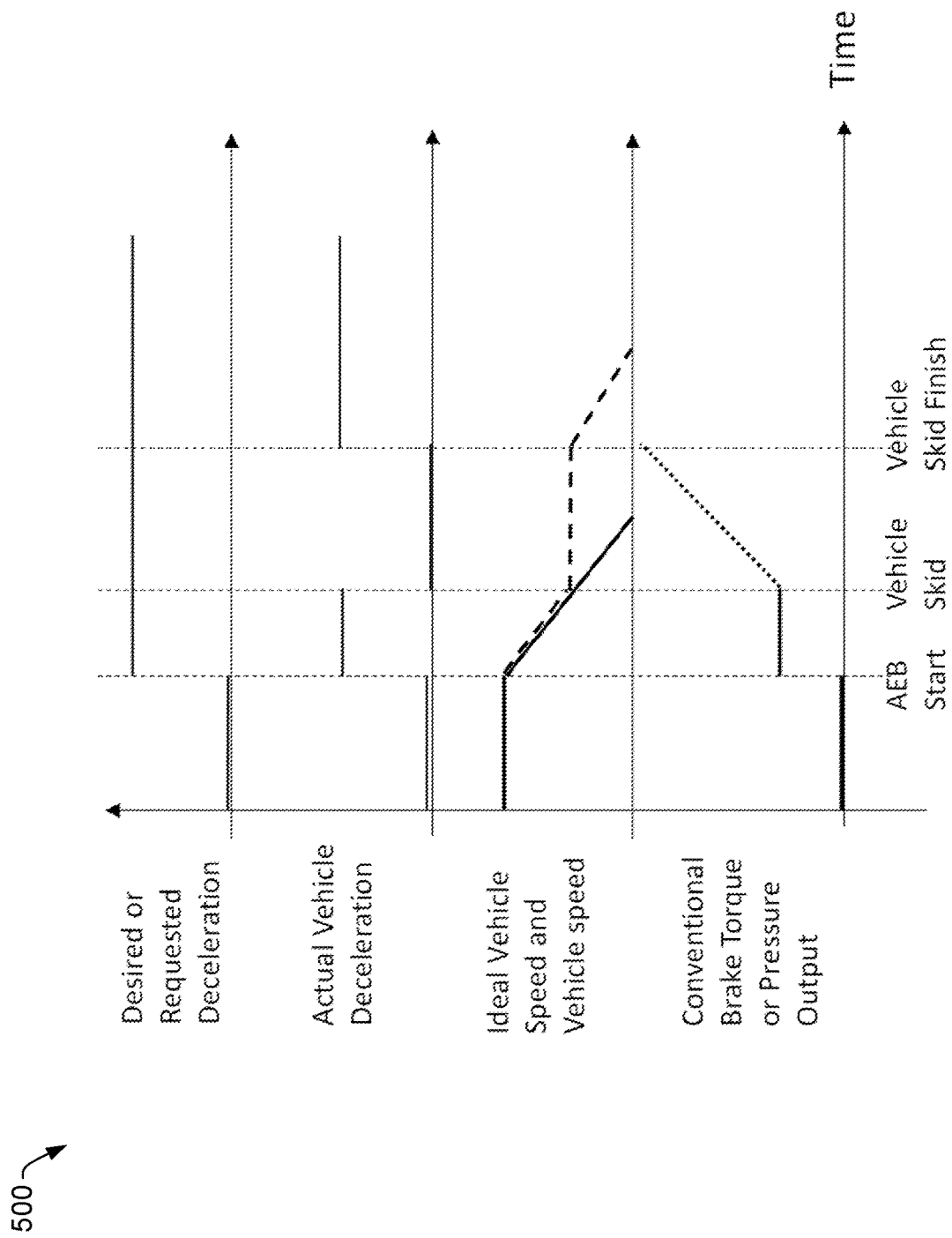
FIG. 5 illustrates examples of desired and actual values related to a braking system, in accordance with aspects of the present disclosure.

The brake control module 308 of FIG. 3 may be similar to (or functionally equivalent to) the brake control 520 of FIG. 5, in control of an example brake system 400 of FIG. 4. FIG. 4 is a block diagram illustrating an example of the braking system 400, in accordance with aspects of the present disclosure. As shown in FIG. 4, the braking system 400 includes at least a mechanism for receiving a braking actuation from a driver, a device for providing brake power assistance (e.g., a booster), a cylinder for pressurizing brake fluids, an electrical motor on the master cylinder, one or more brake lines with brake fluids for transmitting braking power to one or more brakes on rotors of the vehicle. The braking system 400 may also include an electrical power supply, independent from or shared with the vehicle. The braking system 400 may include or in connection with the AD control (such as the AD control 510 of FIG. 5) that operates on the mentioned components/devices with sensor feedbacks therefrom.

Although illustrated separately, the device providing brake power assistance and the electric motor on the master cylinder may be integrated into a common device. For example, the brake actuation by the driver may provide direct actuation to the electric motor on the master cylinder. In other embodiments, the brake power assistance device may be a separate or independent (e.g., hydraulic) system to provide secondary control of the master cylinder, such as for emergency engagement by the driver when AD control does not operate as intended. As discussed herein, the brake control module 308 may reduce the power consumption by the electric motor on the master cylinder to conserve energy when the vehicle performs a traffic stop on a slope or gradient.

FIG. 5 illustrates examples of desired and actual values related to a braking system, in accordance with aspects of the present disclosure. As shown, multiple graphs or plots 500 of different values over a common time axis illustrates aspects of automatic emergency braking. Turning first to the desired or requested deceleration, the ADV first travels without engaging the automatic emergency braking (AEB) system (e.g., the desired or requested deceleration being zero). When the ADV detects an event that triggers the AEB system, the AEB system requests or desires a maximal deceleration (e.g., determined by traction) achievable by the ADV (e.g., as shown by the straight line) until the ADV determines that braking is no longer necessary for safety concerns.

The ADV may not actually achieve the maximal deceleration due to variable road conditions. For example, the road surface may include debris, gravels, leaves, ice, water, and other intermittent substances that may cause the tires of the ADV to lose traction, thus not being able to achieve the maximal deceleration. As shown in the plot of the actual vehicle deceleration in FIG. 5, when the ADV starts skidding and until the skidding is over, the actual vehicle deceleration may be very close to zero (or nominally zero), until the road condition recovers.

Due to skidding, there is a difference between the ideal vehicle speed and the actual vehicle speed, as plotted in the third graph in FIG. 5. As shown in the plot, the solid line indicates the ideal vehicle speed, of which the slope indicates deceleration. For the actual ADV speed plot in view of skidding, the vehicle speed maintains during the skidding, as shown in the dashed line in the plot.

Using conventional feedback controls, during skidding, as the vehicle speed maintains during that period, the control algorithm often increases the braking pressure/torque output in response, as shown in the dotted line in the plot. As a result, when the road condition recovers to pre-skidding conditions, the braking pressure may be excessively high and cause locking or the activation of ABS, negatively impacting the control efficiency and users' ride experience. The present disclosure overcomes such issues by preventing the unreasonable climb of the braking pressure and providing a braking output for the ADV to quickly recover to achieve the maximal deceleration after skidding, as described below.

Figure 6:
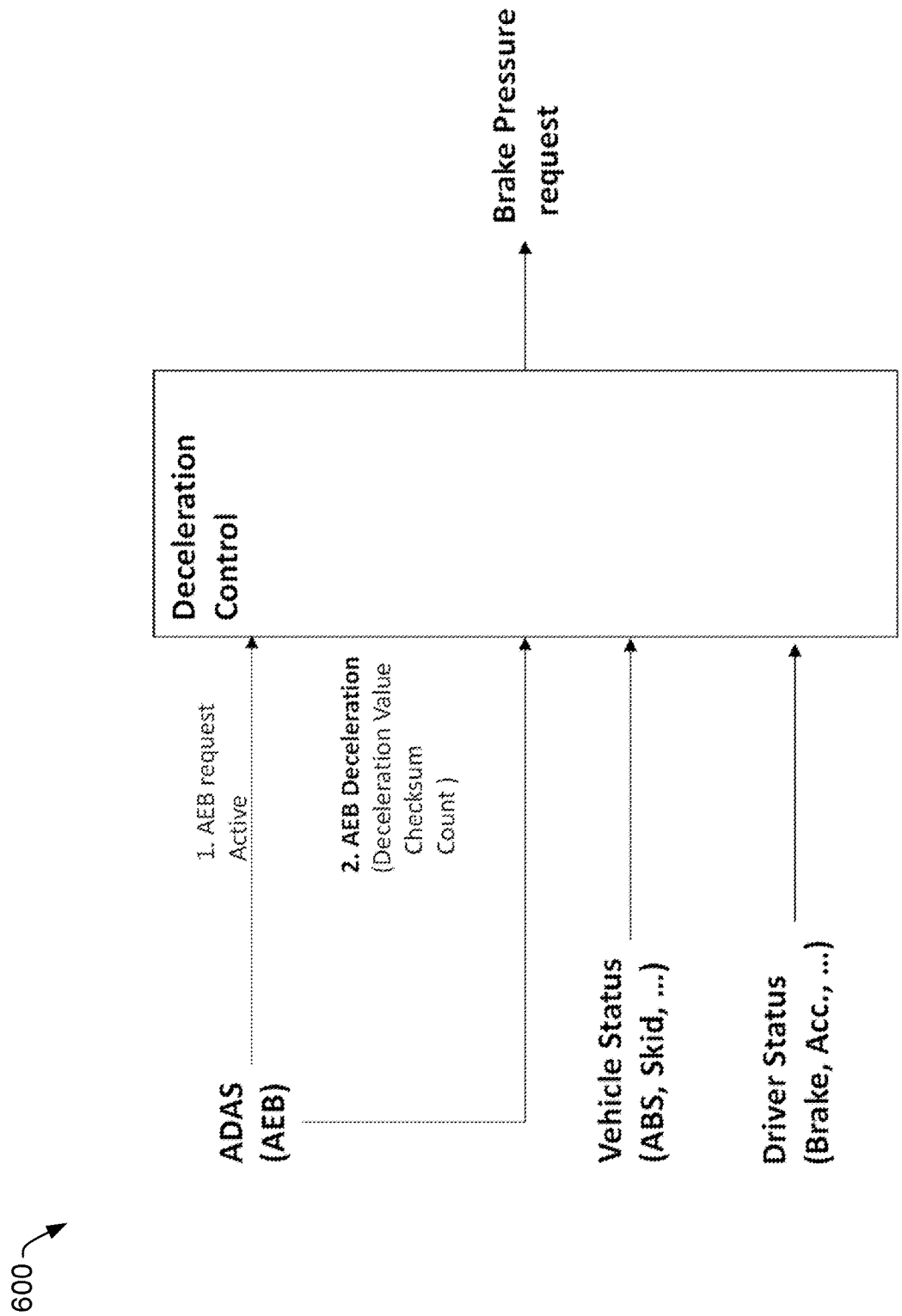
FIG. 6 illustrates an example schematics of a braking control system, in accordance with aspects of the present disclosure.

FIG. 6 illustrates an example schematics of a braking control system 600, in accordance with aspects of the present disclosure. As shown, the ADV may generally include a deceleration control (e.g., hardware including a processing device, a memory, an input/output interface, etc.). The deceleration control receives input signals from an advanced driver-assistance system (ADAS) or a similar module of the ADV. The ADAS or ADV include sensors to be used with light detection and ranging (LIDAR), computer vision, and/or the like to perceive traffic conditions around the vehicle. When an imminent impact with an obstacle is detected, the ADAS or ADV initiates the AEB. For example, as shown in FIG. 6, the ADAS sends an AEB request for activating the AEB as well as an AEB declaration to the deceleration control. In response the deceleration control outputs a request for braking pressure to the braking system, intending to maximize the vehicle deceleration by braking.

As shown, the deceleration control may further receive and consider vehicle status and occupant (e.g., driver(s) and/or passengers) status. For example, the vehicle status may be captured by various sensors to detect skidding of the vehicle. The various sensors may include accelerometers (e.g., during skidding, the deceleration of the vehicle may be nominally small); signals from the ABS (e.g., the ABS detecting an onset of wheel locking due to losing traction); a hall sensor and a GPS receiver or the like detecting a negative difference between a velocity computed based on wheel rotation speeds and the vehicle overall travel velocity (e.g., wheel rotation slows down during skidding while the overall travel velocity maintains to be approximately the same); and other sensors that provide feedback on skidding.

In some cases, the occupant of the ADV may provide operation input, such as braking, steering, and acceleration in view of the emergency. The deceleration control may utilize the input or occupant status to improve its response to the AEB request. For example, the skidding may be caused by a misalignment of the tires and the travel velocity, a steering input from the driver may help the deceleration control better understand or predict the recovery from skidding and determine a proper braking pressure. In some cases, the ADAS may not succeed in timely detecting an emergency or activation of the AEB, and the driver's deceleration input may trigger AEB at the deceleration control instead. In some cases, the situation causing the emergency may have improved and the ADAS may not be able to timely determine such, an acceleration input by driver may help the deceleration control to terminate or reduce the braking pressure request (given other safety conditions have been satisfied, such as verification of potential impact using other sensors or communication devices).

Figure 7:
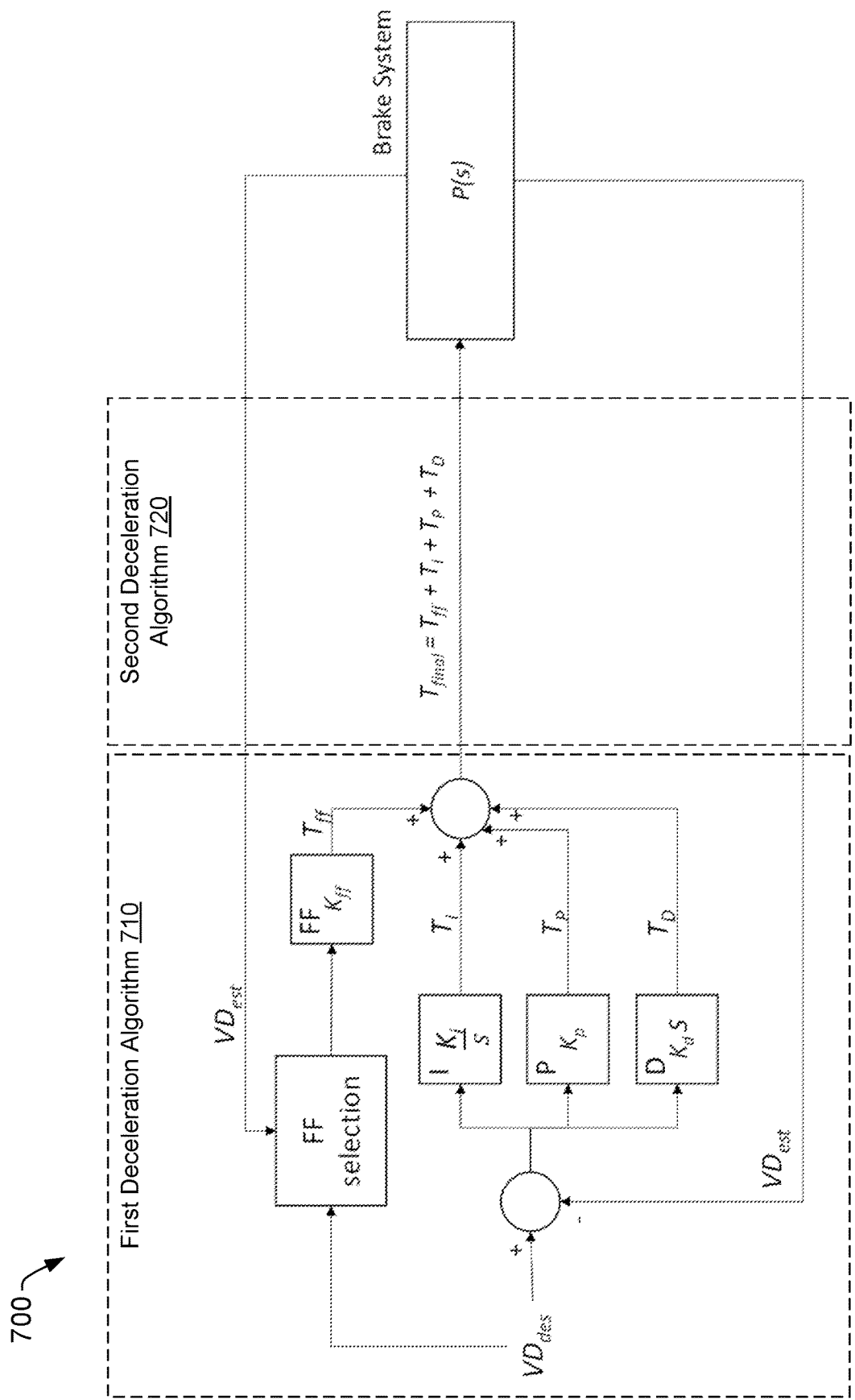
FIG. 7 illustrates an example schematics of two or more braking control algorithms, in accordance with aspects of the present disclosure.

FIG. 7 illustrates an example schematics 700 of two or more braking control algorithms 710 and 720 to be used by the deceleration control of FIG. 6, in accordance with aspects of the present disclosure. As shown, the first deceleration algorithm 710 includes a proportional-integral-derivative (PID) controller with a feedforward (FF) component (e.g., using model predictive control (MPC)). As shown, when the brake system receives a request for braking pressure from the deceleration control of FIG. 6, a desired velocity $VD_{des}$ is sent to the PID controller and the FF selection module. The PID controller may receive a feedback $VD_{est}$ from the braking system and computes, using $VD_{des}$ and $VD_{est}$, a proportional term P (Kp), an integral term I (Ki/s), and a derivative term D ($K_dS$) to output, respectively, $T_1$, $T_P$, and $T_D$. The value T stands for torque, which may be converted into actuation pressure by the brake system. The FF selection module selects, based on $VD_{des}$ and $VD_{est}$, an estimated disturbance to compute with a coefficient $K_{ff}$ for outputting the feedforward term $T_{ff}$. The PID and FF terms are combined into $T_{final}=T_{ff}+T_1+T_P+T_D$ to send to the brake system, which may output a command braking pressure (P(s)) to respective brakes.

During operation, when AEB initiates, the ADV engages the brake system for deceleration using the first deceleration algorithm 710. The ADV may predicate that the first deceleration algorithm 710 and the like produces a maximal level of deceleration for safety considerations (and in some instances, for comport consideration). When the ADV detects an onset of discrepancy between a velocity of the ADV and a corresponding wheel speed of the ADV, the ADV (e.g., ADAS of FIG. 6) may, along with the vehicle status report in FIG. 6, determine that the ADV has lost or is about to lose traction (e.g., skidding occurs). In response, the ADV may override the output (e.g., $T_{final}$) of the first deceleration algorithm using the second deceleration algorithm 720. The second deceleration algorithm 720 prioritizes in reducing the discrepancy between the velocity of the ADV and the corresponding wheel speed of the ADV over a target rate of deceleration computed by the first deceleration algorithm. This way, when the road condition that causes skidding improves (e.g., one or more tires of the ADV regaining traction), the brake pressure applied by the brake system will not be excessive as the first deceleration algorithm 710 would have computed (see FIG. 5). Details of the second deceleration algorithm 720 are further discussed in FIGS. 8-10.

Figure 8:
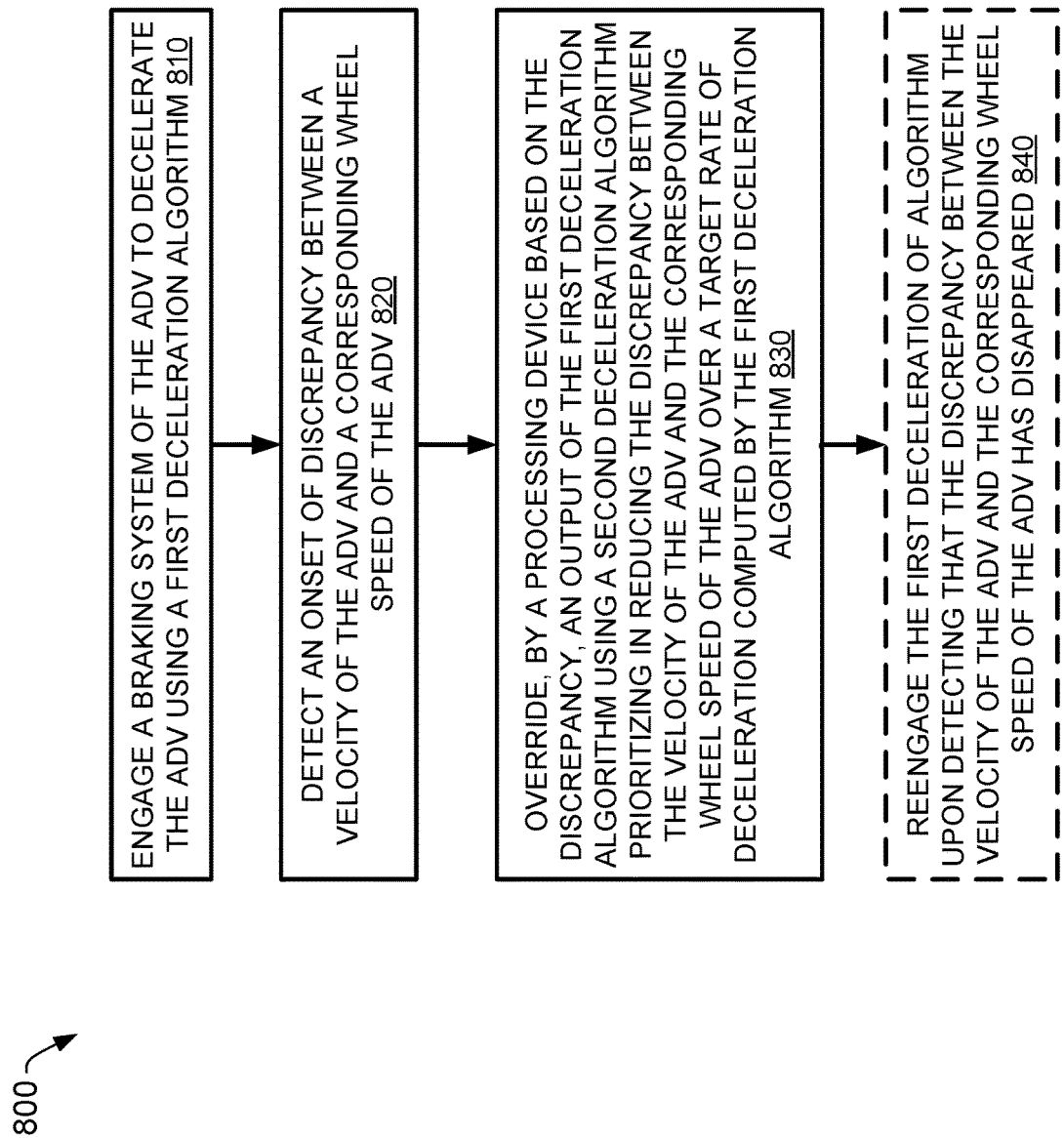
FIG. 8 is a flow diagram illustrating a method of deceleration by a controlling device of an autonomous driving vehicle, in accordance with aspects of the present disclosure.

FIG. 8 is a flow diagram 800 illustrating a method of deceleration by a controlling device of an autonomous driving vehicle, in accordance with aspects of the present disclosure. The method of the flow diagram 800 may be performed by the deceleration control module of FIG. 6, the braking unit 203 of FIG. 2, the brake control module 308 of FIG. 3, and/or the AD control of FIG. 4. As shown in FIG. 8, the method starts by engaging 810 a braking system of the ADV to decelerate the ADV using a first deceleration algorithm, such as the algorithm 710 of FIG. 7.

At 820, the ADV detects an onset of discrepancy between a velocity of the ADV and a corresponding wheel speed of the ADV. At 830, a processing device of the ADV, based on the discrepancy, overrides an output of the first deceleration algorithm using a second deceleration algorithm that prioritizes in reducing the discrepancy between the velocity of the ADV and the corresponding wheel speed of the ADV over a target rate of deceleration computed by the first deceleration algorithm. For example, the second deceleration algorithm may correspond to the second deceleration algorithm 720 of FIG. 7.

In aspects, the ADV reengages, at 840, the first deceleration of algorithm upon detecting that the discrepancy between the velocity of the ADV and the corresponding wheel speed of the ADV has disappeared.

In aspects, engaging the braking system of the ADV using the first deceleration algorithm includes activating an emergency braking procedure in response to detecting a potential impact with a front object. For example, the first deceleration algorithm includes a feedforward component and a feedback component. The feedforward component includes a feedforward term from at least one of: a model predictive control, an adaptive control, an internal model control, a disturbance observer-based control, or a linear-quadratic-Gaussian control.

In some cases, the feedback component includes at least one of a proportional term proportional to an error between a setpoint and a process variable associated with a relative distance or velocity measured against the front object, an integral term proportional to an accumulated error over time, or a derivative term proportional to a rate of change of the error between the setpoint and the process variable. For example, the first deceleration algorithm includes a PID controller with an FF component, as shown in FIG. 7.

In some cases, engaging the braking system of the ADV using the first deceleration algorithm further includes generating a braking torque by the braking system of the ADV based on the output of the first deceleration algorithm computed from the feedforward term, the proportional term, the integral term, and the derivative term.

In some cases, the second deceleration algorithm includes a first coefficient modifying the feedforward term of the first deceleration algorithm; a second coefficient modifying the integral term of the first deceleration algorithm; and a third coefficient modifying a previously used feedforward term based on the feedforward term. In some cases, the second deceleration algorithm ignores the proportional term and the derivative term of the first deceleration algorithm. An example of the application of the second deceleration algorithm is further shown and discussed in FIG. 9.

In some cases, the second deceleration algorithm recalls a previous braking torque or pressure computed by the first deceleration algorithm prior to detecting the onset of discrepancy between the velocity of the ADV and the corresponding wheel speed of the ADV. For example, the braking torque or pressure prior to skidding may achieve a proper level of deceleration when the road condition resumes to pre-skidding situation, without having an excessive braking torque or pressure that would have been computed using the first deceleration algorithm.

In aspects, detecting the onset of discrepancy includes receiving a trigger signal from an anti-lock braking system (ABS) of the braking system of the ADV.

Figure 9:
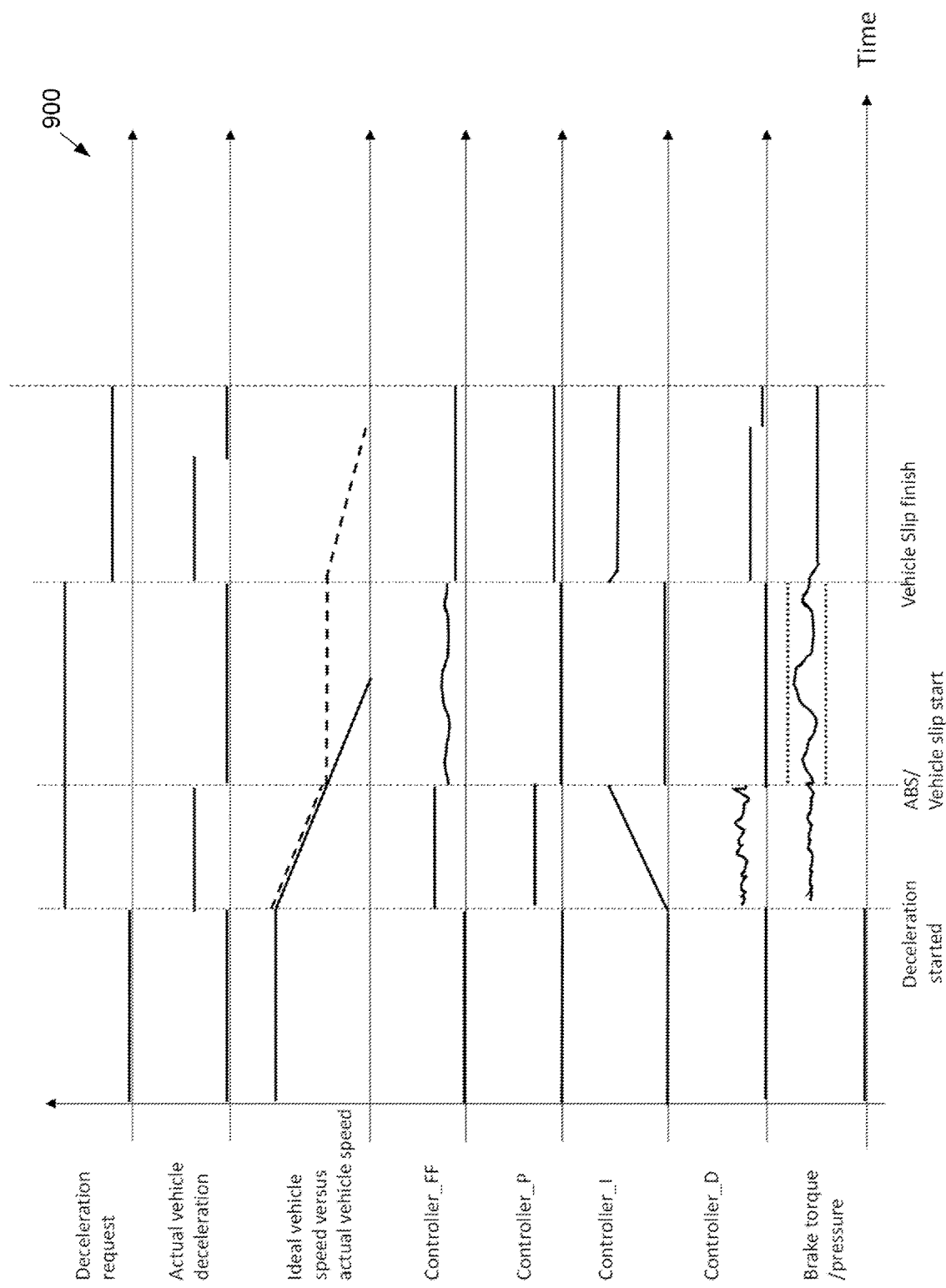
FIG. 9 illustrates examples of parameters and values related to skid avoidance during emergency braking with control algorithm override, in accordance with aspects of the present disclosure.

FIG. 9 illustrates examples 900 of parameters and values related to skid avoidance during emergency braking with control algorithm override, in accordance with aspects of the present disclosure. As shown, multiple values are plotted against a common time axis. The multiple values include the deceleration request (e.g., in terms of brake torque or pressure), the actual vehicle deceleration, a comparison between an ideal vehicle speed and the actual vehicle speed, a value for the FF term of the deceleration controller, a value for the proportional term of the deceleration controller, a value for the integral term of the deceleration controller, a value for the derivative term of the deceleration controller, and the actual output brake torque or pressure (e.g., based on both the first and the second deceleration algorithms).

As shown in FIG. 9, skidding or slipping of the ADV is represented between the "ABS/vehicle slip start" and the "vehicle slip finish" time stamps. Unlike the output based on PID and FF controller as illustrated in FIG. 5, the final output of the brake torque or pressure is confined in a range (as opposed to the continuous ramping up due to a lack of proper consideration by the first deceleration algorithm regarding the skidding). The range provides an approximate brake pressure/torque output that is applicable when the traction resumes, and is computed based on the FF and PID terms overridden by the second deceleration algorithm.

For example, as shown in FIG. 9, the second deceleration algorithm applies a near zero coefficient to the proportional term "Controller_P" and the derivative term "Controller D" to prevent a substantial climb of the controller output. The second deceleration algorithm applies a variable coefficient to the FF term "Controller_FF" slightly below the FF term prior to skidding. The second deceleration algorithm applies a reduced integral term "Controller_I" and computes the final output as:

$$T_{brake} = a \times T_{FF} + b \times T_I$$

where: (the proportional term and the derivative terms are both overridden to be zero)

$$T_{FF} = T_{FF-1} \div c$$
$$T_I = T_{I-1}$$

In some cases, the second deceleration algorithm recalls the value of FF and the integral term of the moment before skidding and resets proportional and derivative terms of the PID controller of the first deceleration algorithm. This way, the second control algorithm avoids the integral term increases and applies excessive braking pressure, and allows the integral term to return to a proper level when the skidding is over. As such (e.g., by confining the output of braking torque or pressure as shown), the second deceleration algorithm allows the brake system to generate a proper output faster than using the first deceleration algorithm alone, resulting in a quicker deceleration and a reduced braking distance.

Figure 10:
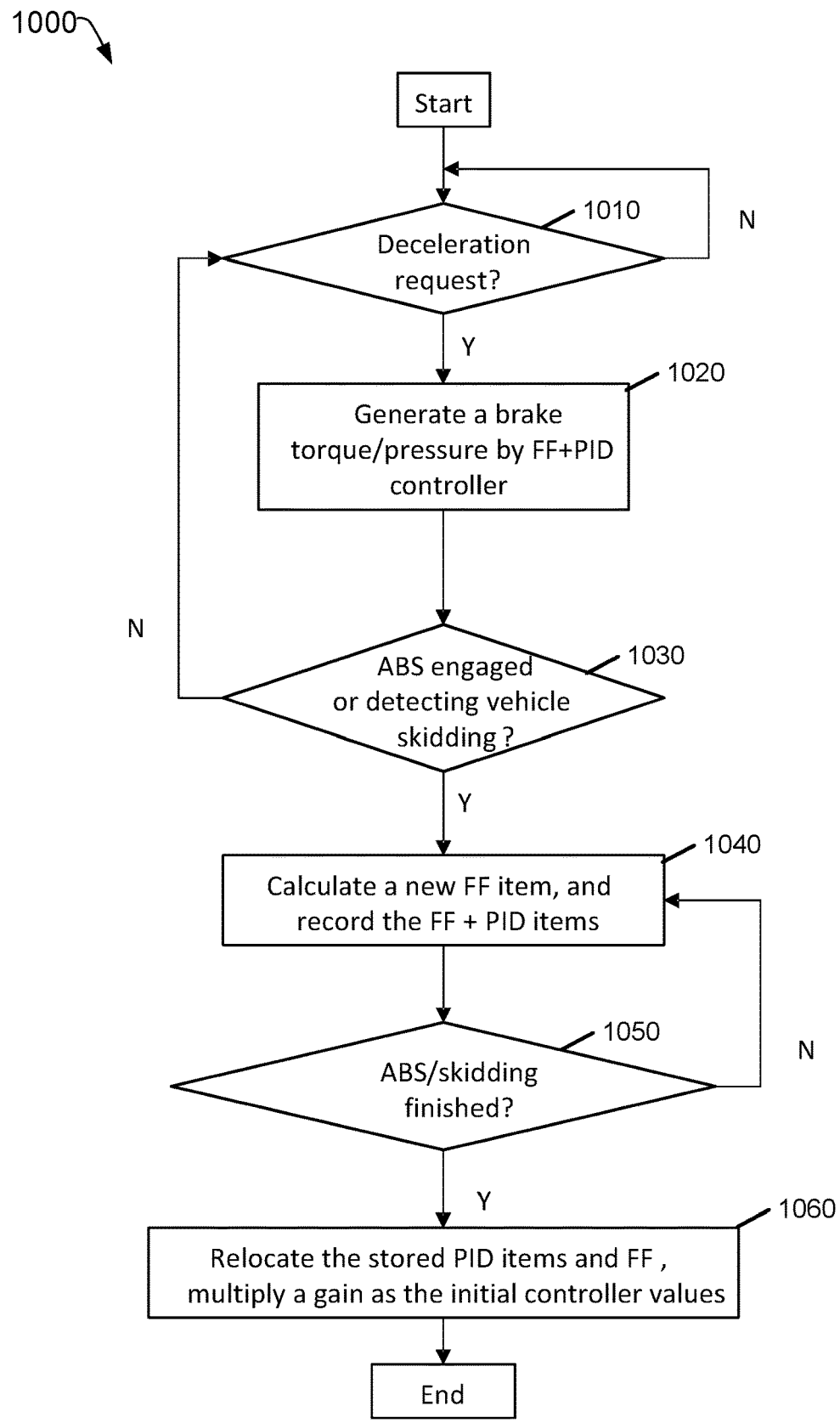
FIG. 10 illustrates an example braking procedure of skid avoidance during emergency braking with control algorithm override for the braking system of FIG. 6, in accordance with aspects of the present disclosure.

FIG. 10 illustrates an example braking procedure 1000 of skid avoidance during emergency braking with control algorithm override for the braking system of FIG. 6, in accordance with aspects of the present disclosure. For example, the braking procedure 1000 may be used by a brake control system (e.g., of the deceleration control of FIG. 6) of the ADV. As shown, at 1010, the brake control system determines whether a deceleration has been requested, such as a deceleration requested by the AEB. When a deceleration has been requested, the brake control system generates, at 1020, a brake torque or pressure by a controller using the first deceleration algorithm (e.g., PID and FF). Otherwise, when the brake control system has not received a deceleration request, the brake control system resets the braking procedure 1000.

At 1030, the brake control system determines whether vehicle skidding has been detected or the ABS of the ADV has engaged, after applying the brake torque or pressure generated using the first deceleration control algorithm. If not (e.g., no skidding has been detected), the braking procedure 1000 loops back to continuously use the FF and PID controller for braking until no deceleration request is received at 1010 (thus resetting the braking procedure 1000).

When skidding occurs, the brake control system calculates, at 1040, a new FF term using the second deceleration control algorithm as discussed above and record the FF and PID terms prior to skidding. For example, the brake control system stores the value of FF, and $T_I$ of the moment just before ABS engaged, and reset of $T_p$ and $T_d$ of the deceleration request controller.

At 1050, the brake control system determines that whether the skidding is over. If not, the brake control system repeats operation 1040. If the skidding is over, the brake control system relocates, at 1060, the recorded/stored PID and FF terms, which may be multiplied by a respective gain (e.g., initial controller values). As such, the brake control system prevents the $T_I$ from increasing out of practicality during skidding and allows the controller terms to return to proper (e.g., non-skidding) levels after skidding.

In some cases, the brake control system reloads the value of FF and $T_1$ of the time instant before ABS engagement, and recalculates the of $T_p$ and $T_d$ of the deceleration request controller. The second deceleration control algorithm allows the brake control system to be faster to get the desired controller output and decelerate the ADV to the desired speed more quickly (than using the first deceleration control algorithm alone).

Upon determining rates of deceleration and related braking parameters, the control algorithm may provide various example outputs to various systems of the ADV. For example, the example outputs may include control signals to the primary brake system, the secondary brake system (which may engage upon detecting malfunctioning of the primary brake system), the primary steering system (e.g., upon determining that an acceptable rate of deceleration cannot be achieved and that the ADV may safely change traveling lane to avoid collision), and the secondary steering system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for deceleration by a controlling device of an autonomous driving vehicle (ADV), the method comprising:
    engaging a braking system of the ADV to decelerate the ADV using a first deceleration algorithm that activates an emergency braking procedure in response to detecting a potential impact;
    detecting an onset of discrepancy between a velocity of the ADV and a corresponding wheel speed of the ADV; and
    overriding, by a processing device based on the discrepancy, an output of the first deceleration algorithm using a second deceleration algorithm prioritizing in reducing the discrepancy between the velocity of the ADV and the corresponding wheel speed of the ADV over a target rate of deceleration computed by the first deceleration algorithm.

2. The method of claim 1, wherein engaging the braking system of the ADV using the first deceleration algorithm comprises:
    detecting the potential impact with a front object.

3. The method of claim 2, wherein the first deceleration algorithm comprises a feedforward component and a feedback component,
    the feedforward component comprising a feedforward term from at least one of:
        a model predictive control,
        an adaptive control,
        an internal model control,
        a disturbance observer-based control, or
        a linear-quadratic-Gaussian control; and
    the feedback component comprising at least one of:
        a proportional term proportional to an error between a setpoint and a process variable associated with a relative distance or velocity measured against the front object,
        an integral term proportional to an accumulated error over time, or a derivative term proportional to a rate of change of the error between the setpoint and the process variable.

4. The method of claim 3, wherein engaging the braking system of the ADV using the first deceleration algorithm further comprises:
generating a braking torque by the braking system of the ADV based on the output of the first deceleration algorithm computed from the feedforward term, the proportional term, the integral term, and the derivative term.

5. The method of claim 4, wherein the second deceleration algorithm comprises:
a first coefficient modifying the feedforward term of the first deceleration algorithm;
a second coefficient modifying the integral term of the first deceleration algorithm; and
a third coefficient modifying a previously used feedforward term based on the feedforward term.

6. The method of claim 5, wherein the second deceleration algorithm ignores the proportional term and the derivative term of the first deceleration algorithm.

7. The method of claim 5, further comprises:
recalling, by the second deceleration algorithm, a previous braking torque computed by the first deceleration algorithm prior to detecting the onset of discrepancy between the velocity of the ADV and the corresponding wheel speed of the ADV.

8. The method of claim 1, wherein detecting the onset of discrepancy comprises:
receiving a trigger signal from an anti-lock braking system (ABS) of the braking system of the ADV.

9. The method of claim 1, further comprising:
reengaging the first deceleration of algorithm upon detecting that the discrepancy between the velocity of the ADV and the corresponding wheel speed of the ADV has disappeared.

10. A data processing system of an autonomous driving vehicle (ADV), comprising:
a processor; and
a memory coupled to the processor to store instructions, which when executed by the processor, cause the processor to perform operations, the operations including:
engaging a braking system of the ADV to decelerate the ADV using a first deceleration algorithm that activates an emergency braking procedure in response to detecting a potential impact;
detecting an onset of discrepancy between a velocity of the ADV and a corresponding wheel speed of the ADV; and
overriding, by a processing device based on the discrepancy, an output of the first deceleration algorithm using a second deceleration algorithm prioritizing in reducing the discrepancy between the velocity of the ADV and the corresponding wheel speed of the ADV over a target rate of deceleration computed by the first deceleration algorithm.

11. The data processing system of claim 10, wherein the operations of engaging the braking system of the ADV using the first deceleration algorithm comprises:
detecting the potential impact with a front object.

12. The data processing system of claim 11, wherein the first deceleration algorithm comprises a feedforward component and a feedback component,
the feedforward component comprising a feedforward term from at least one of:
a model predictive control,
an adaptive control,
an internal model control,
a disturbance observer-based control, or
a linear-quadratic-Gaussian control; and
the feedback component comprising at least one of:
a proportional term proportional to an error between a setpoint and a process variable associated with a relative distance or velocity measured against the front object,
an integral term proportional to an accumulated error over time, or
a derivative term proportional to a rate of change of the error between the setpoint and the process variable.

13. The data processing system of claim 12, wherein the operations of engaging the braking system of the ADV using the first deceleration algorithm further comprises:
generating a braking torque by the braking system of the ADV based on the output of the first deceleration algorithm computed from the feedforward term, the proportional term, the integral term, and the derivative term.

14. The data processing system of claim 13, wherein the second deceleration algorithm comprises:
a first coefficient modifying the feedforward term of the first deceleration algorithm;
a second coefficient modifying the integral term of the first deceleration algorithm; and
a third coefficient modifying a previously used feedforward term based on the feedforward term.

15. The data processing system of claim 14, wherein the second deceleration algorithm ignores the proportional term and the derivative term of the first deceleration algorithm.

16. The data processing system of claim 14, wherein the operations further comprise:
first deceleration algorithm prior to detecting the onset of discrepancy between the velocity of the ADV and the corresponding wheel speed of the ADV.

17. The data processing system of claim 10, wherein the operation of detecting the onset of discrepancy comprises:
receiving a trigger signal from an anti-lock braking system (ABS) of the braking system of the ADV.

18. The data processing system of claim 10, wherein the operations further comprise:
reengaging the first deceleration of algorithm upon detecting that the discrepancy between the velocity of the ADV and the corresponding wheel speed of the ADV has disappeared.

19. A non-transitory machine-readable medium having instructions stored therein, which when executed by a processor, cause the processor to perform operations, the operations comprising:
engaging a braking system of an autonomous driving vehicle (ADV) to decelerate the ADV using a first deceleration algorithm that activates an emergency braking procedure in response to detecting a potential impact;
detecting an onset of discrepancy between a velocity of the ADV and a corresponding wheel speed of the ADV; and
overriding, by a processing device based on the discrepancy, an output of the first deceleration algorithm using a second deceleration algorithm prioritizing in reducing the discrepancy between the velocity of the ADV and the corresponding wheel speed of the ADV over a target rate of deceleration computed by the first deceleration algorithm.

20. The non-transitory machine-readable medium of claim 19, wherein the operations further comprise:
   reengaging the first deceleration of algorithm upon detecting that the discrepancy between the velocity of the ADV and the corresponding wheel speed of the ADV has disappeared.

\* \* \* \* \*